June 16, 1964 A. CIOCCIO ETAL 3,137,823

MAGNETIC AMPLIFIER

Filed Nov. 30, 1961 2 Sheets-Sheet 1

INVENTORS.
ARMAND CIOCCIO
ERNEST C. GRANT
HERMAN M. FRAZIER
HOWARD A. LEWIS

BY W. O. Quesenberry
D. Hodges
ATTYS.

June 16, 1964 A. CIOCCIO ETAL 3,137,823

MAGNETIC AMPLIFIER

Filed Nov. 30, 1961 2 Sheets-Sheet 2

INVENTORS.
ARMAND CIOCCIO
ERNEST C. GRANT
HERMAN M. FRAZIER
HOWARD A. LEWIS

BY W. O. Quesenberry
O. C. Hodges ATTYS.

United States Patent Office 3,137,823 Patented June 16, 1964

3,137,823

MAGNETIC AMPLIFIER

Armand Cioccio, Wheaton, Silver Spring, Md., Herman M. Frazier, Washington, D.C., Ernest C. Grant, Ann Arbor, Mich., and Howard A. Lewis, Marengo, Ill., assignors to the United States of America as represented by the Secretary of the Navy Filed Nov. 30, 1961, Ser. No. 156,177
3 Claims. (Cl. 330—8)
(Granted under Title 35, U.S. Code (1952), sec. 266)

The invention described herein may be manufactured and used by or for the Government of the United States of America for governmental purposes without the payment of any royalties thereon or therefor.

The present invention relates to improvements in electronic amplifiers and more particularly to a basically new and improved pulse type, variable current, magnetic amplifier. Although magnetic amplifiers per se are known in the prior art, modern military applications require magnetic amplifiers having greatly increased sensitivity, more uniform output, and much greater stability than has been provided by presently known magnetic amplifiers. The prior art also has been confronted with problems in reducing the capacitance effects and in obtaining a high input impedance. In order to meet the aforesaid requirements of modern military applications, a new concept in the basic design of pulse type magnetic amplifiers as well as new and advanced techniques in regard to the materials used, the constructional details, and the methods of assembly have been required. The subject disclosure is directed primarily to the electronic circuitry which contains a new design concept and which provides the basic advancement in this field upon which the aforementioned advanced techniques may be employed.

The general purpose is to provide a new and improved pulse type magnetic amplifier which not only embraces all of the advantages of similarly employed magnetic amplifiers of the prior art but which also provides a sensitivity of five times that provided by the prior art devices. To obtain this, the present invention contemplates a unique five winding amplifier whereby the previously unobtainable results in sensitivity, stability, and uniformity of output may be achieved.

Another object is to provide a pulse type magnetic amplifier wherein there is a substantial reduction in the capacitance effect caused by the number of windings surrounding the core.

A still further object of the present invention is the provision of a magnetic amplifier having a high input impedance.

Yet another object of the invention is to provide a magnetic amplifier requiring a very low standby power in the order of a few milliwatts.

Other objects and advantages of the invention will become more fully apparent from the following description taken with the annexed drawings which illustrate a preferred embodiment, and wherein.

Figure 6:
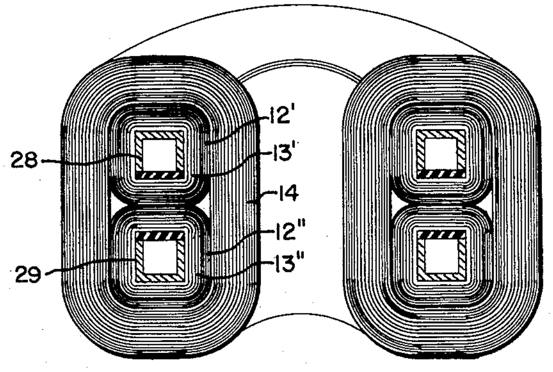

FIGS. *5a–5d* illustrate the different wave forms resulting from a single cycle signal as it appears on the various components of the system; and FIG. 6 is a simplified, cross sectional view of the magnetic amplifier showing the various windings in their proper physical relationship.

Figure 1:
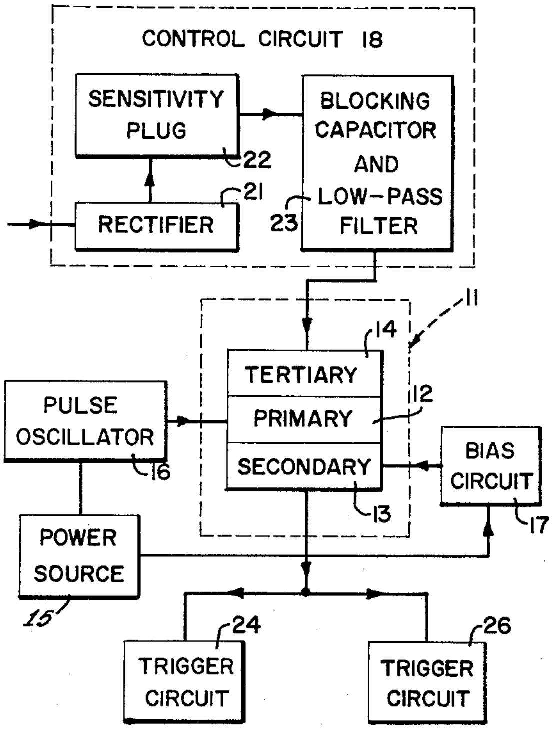
FIG. 1 is a block diagram showing the location of the magnetic amplifier in a preferred environment.

Referring now to the drawings which illustrate a preferred embodiment and wherein like reference numerals designate like parts throughout the several views, FIG. 1 shows magnetic amplifier 11 having a primary winding 12, a secondary winding 13 and a tertiary winding 14 which receive signals from pulse oscillator 16, bias circuit 17 and control circuit 18 respectively. As further shown in FIG. 1, the output from the magnetic amplifier is taken from secondary windings 13 and may be applied, for example, to one or the other of trigger circuits 24 or 26 depending upon the polarity of the output signal. Each of trigger circuits 24 and 26 contains one or more cold-cathode gas trigger tubes which are triggered into conduction by a voltage pulse applied to their grids. It is to be understood that the output from the secondary 13 of magnetic amplifier 11 may obviously be applied to other and different circuitry than trigger circuits 24, 26 which are illustrated merely as being exemplary of one particular application.

Figure 2:
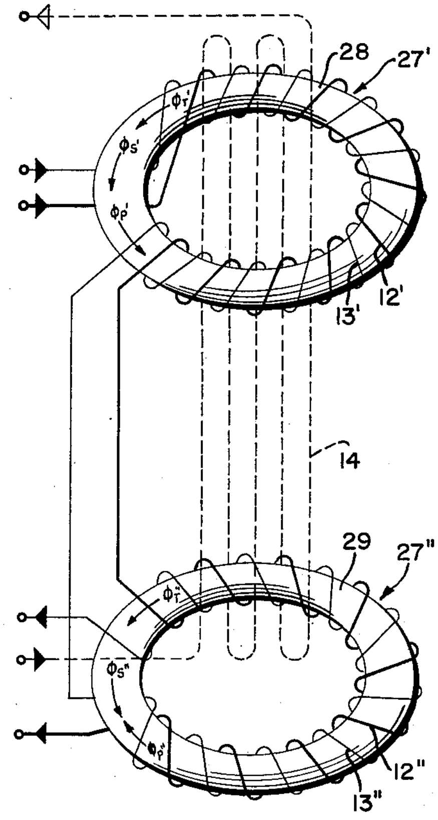
FIG. 2 is a schematic view of the magnetic amplifier showing only a small portion of the windings on each core for purposes of clarity.

FIG. 2 shows magnetic amplifier 11 as consisting essentially of a pair of substantially identical two-winding transformers 27′ and 27″ containing highly non-linear magnetic cores 28 and 29 respectively. Primary windings 12′ and 12″ are connected in series aiding and carry a common current while secondary windings 13′ and 13″ are connected in series opposition. Transformers 27′ and 27″ are placed face-to-face such that the direction of their primary windings from start to finish is opposite for the two cores, whereupon, a tertiary winding 14 is wound common to both. When a common current flows through primary windings 12′ and 12″, the resultant fluxes $\phi_{p'}$ and $\phi_{p''}$ in the two cores are in opposite directions, however, since tertiary winding 14 is common to both cores, current flow through it produces flexes $\phi_{t'}$ and $\phi_{t''}$ in each core in the same direction. Thus, with a current in tertiary 14, one core is driven more into saturation and the other less into saturation. Since the two transformers are magnetically identical, or are made identical by biasing as will be explained hereinafter, the instantaneous voltages across secondary windings 13′ and 13″ with no current in the tertiary are approximately equal and of opposite sign thereby producing a minimum zero output however, when a D.C. or low frequency current flows in tertiary or control winding 14, it magnetizes the cores as stated above and produces a dissimilarity in their magnetic states, whereupon a resultant output voltage appears across secondaries 13′ and 13″. In this manner, a very small D.C. or low frequency current fed to the tertiary winding controls the release of relatively large pulses. The primary windings 12′ and 12″ serve as the input windings and may be pulsed, for example, at a rate of 3 pulses per second from pulse oscillator 16. Secondary windings 13′ and 13″ serve as the output windings from which the output of the magnetic amplifier may be applied to trigger circuits 24 or 26 depending upon the polarity of the voltage output, as will be hereinafter more fully explained.

Figure 3:
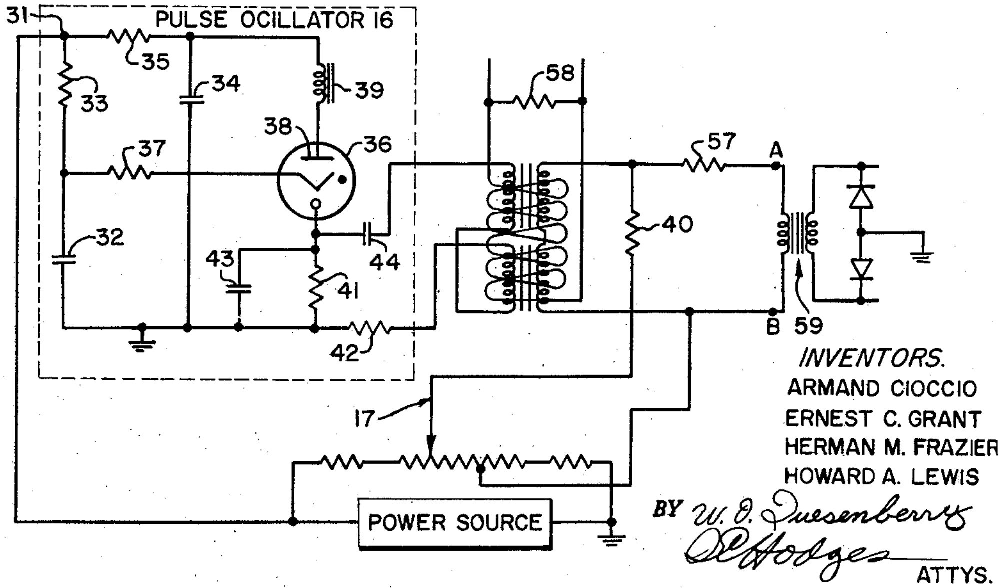
FIG. 3 is a circuit diagram of the pulse oscillator and the magnetic amplifier shown in FIG. 1.

As shown in the block diagram of FIG. 1 and as further shown in the circuit diagram of FIG. 3 the magnetic amplifier 11 is driven by pulse oscillator 16 which produces short pulses at approximately the rate of three pulses per second. The imposed circuit requirements make a relaxation oscillator such as 16 an ideal type to drive the magnetic amplifier. When voltage from power supply 15 is applied to input 31 of the oscillator, capacitor 32 begins to charge through resistor 33 and capacitor 34 begins to charge through resistor 35. The time constant of the capacitor-resistor combination 32–33 is roughly 50 times that of the capacitor-resistor combination 34–35 so that capacitor 34 is fully charged well before capacitor 32. This assures that capacitor 34 will deliver constant energy from pulse to pulse. When capacitor 32 has charged to the grid breakdown voltage of cold-cathode tube 36, a grid-cathode discharge begins through resistor 37 which is quickly transferred to the main anode 38. Capacitor 34 now begins to discharge through inductance 39, cathode tube 36 and the load circuit of the oscillator. As capacitors 32 and 34 discharge, the voltage source begins to furnish current to the oscillator which is limited, however, by the large values of resistors 35 and 33. Therefore, the voltage across cathode tube 36 drops rapidly as capacitor 34 discharges, and quickly reaches the extinction potential of the tube. Once the tube is extinguished, conduction cannot begin again until capacitor 32 is again charged to the grid breakdown potential of tube 36.

Retardation coil 39 serves two purposes in that, after the current through it reaches a peak, its inductance forces continued conduction of cold cathode tube even after the capacitor 34 has reached the extinction potential of the tube. This insures discharge of capacitor 34 to below the extinction voltage of the tube before recharging. This, in turn, insures positive extinguishment of the tube. Secondly, the inductance of coil 39 limits the peak flow of current in the tube, thus insuring long tube life.

Resistor 41 and capacitors 43 and 44 form a pulse-shaping network. The values of resistor 41 and capacitor 43 are selected for each of the cores having the same core material to yield the optimum current pulse to the primary winding 12 of magnetic amplifier 11.

Figure 4:
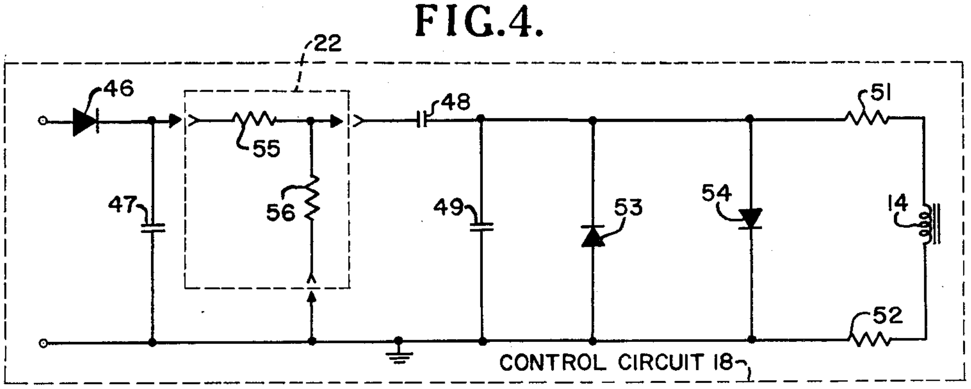
FIG. 4 is a circuit diagram of the control circuit shown in FIG. 1.

As shown in the block diagram of FIG. 1 and as shown more particularly in the circuit diagram of FIG. 4, the signal applied to tertiary winding 14 is obtained from control circuit 18 which, for purposes of illustration, may be assumed to be supplied with a carrier signal 19 having an envelope 20 (see FIG. 5*a*) which varies in magnitude with a period of 10–120 seconds per cycle and which is supplied from a suitable source not shown. Since rectifier 46 conducts current only on the positive half-cycle of the signals, capacitor 47 is charged by a pulsating D.C. current. In the presence of a signal of constant amplitude, blocking capacitor 48 becomes charged to the value of the attenuated, rectified voltage, however, upon a change in the value of the rectified voltage, capacitor 48 will charge or discharge depending upon the polarity of the voltage change. The resulting charging or discharging current is applied through the low-pass filter consisting of capacitor 49, resistor 51 and resistor 52 to the tertiary winding 14 of magnetic amplifier 11.

It is to be understood that a pulsating D.C. signal having a 10–120 second period of oscillation could be applied directly to tertiary 14 in place of the above described carrier signal.

Rectifiers 53 and 54, connected as a varistor, provide for rapid restabilization of the coupling circuit after a large signal has passed therethrough and also limit the current through the tertiary of the magnetic amplifier resulting from a large signal. As shown in FIG. 4, sensitivity plug 22 acts as a voltage divider connected across capacitor 47 and is comprised of resistors 55 and 56 the values of which may be varied in order to obtain greater or lesser attenuation.

Figures 5A, 5B, 5C, 5D:
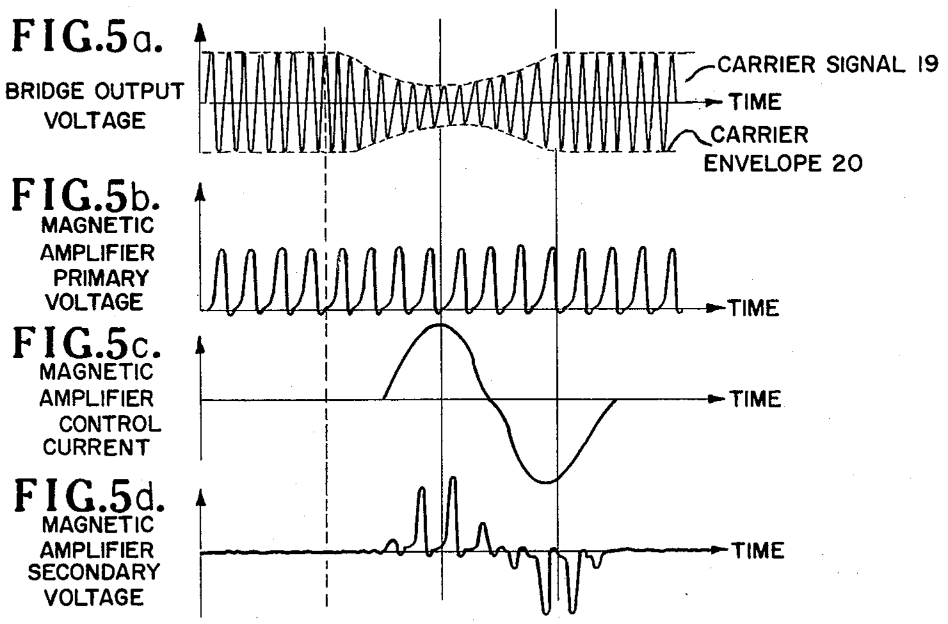

The operation of the magnetic amplifier will now be described with particular reference to FIGS. 5*a* through 5*d*. FIG. 5*a* shows carrier signal 19 having an envelope 20 of constant magnitude to the left of the dotted line which indicates the start of a signal. FIG. 5*b* illustrates the three pulse per second signal which is applied to the primary windings 12' and 12'' of the amplifier 11. At this time, the tertiary current in the magnetic amplifier is zero as shown in FIG. 5*c* and the secondary voltage from the amplifier is a minimum as shown in FIG. 5*d*. This is due to the fact that signal 19 is rectified in control circuit 18 and the resultant pulsating D.C. voltage charges capacitor 48 to a constant voltage and no current flows in tertiary winding 14. However, upon a decrease in the voltage of carrier envelope 20, capacitor 48 discharges to a new value of the rectified voltage with a resulting discharge current flow through tertiary winding 14 as shown in FIG. 5*c*. Since the primary windings 12' and 12'' are being pulsed at a rate of 3 pulses per second, the unbalance due to the tertiary current now flowing causes pulses to appear at the secondary as shown in FIG. 5*d* with point A (see FIG. 3) being positive with respect to point B. Conversely, upon an increase in the magnitude of carrier envelope 20, a current is caused to flow in the reverse direction through the tertiary windings of the amplifier and consequently an output voltage appears across the secondary which is negative in polarity. As pointed out hereinbefore, the output voltage from secondary windings 13' and 13'' may be applied to the grids of cold-cathode tubes in trigger circuits 24, 26 to trigger one of them into conduction. This is accomplished by the use of a double diode polarizing circuit across the output of transformer 59 as shown in FIG. 3.

At this point it should be noted that, when the current flows through the tertiary winding, a pulse appears thereacross as well as at the secondary winding. Current flow in either the secondary or tertiary windings as a result of the output pulse tends to increase the unbalance between the cores. This action is a type of positive feedback which makes the sensitivity of the amplifier dependent upon the output currents of the secondary and tertiary windings. Thus, the sensitivity of the amplifier may be varied by varying the load on either or both of these windings and therefore the value of resistor 57 (see FIG. 3) is selected to provide the desired sensitivity. Increasing the secondary load resistor 57 decreases the sensitivity and resistor 57 also limits the output current of the secondary which prevents "hanging-up"; that is, an unbalance in the cores so great that they fail to return to their original condition after each pulse of primary current. If necessary, the amplifier sensitivity may also be reduced during manufacture of the amplifier by increasing the load on the tertiary winding. For individual magnetic amplifiers with high sensitivities, this is accomplished by placing resistor 58 across the tertiary winding as shown in FIG. 3. This resistor does not shunt the input signal since it is very much larger than the D.C. resistance of the tertiary winding. It decreases the sensitivity by absorbing power in the output pulse which would otherwise have been delivered to output transformer 59.

Due to the practical difficulties in manufacturing two cores which are exactly identical in their magnetic characteristics, it may be desirable to provide an external biasing current to balance the amplifier.

By the use of potentiometer 30 and resistor 40 of biasing circuit 17, this current may be supplied from power source 15, which is also used to operate pulse oscillator 16, and applied to the secondary windings 13' and 13'' of the amplifier so that the biasing current biases one core in the positive direction and the other core in the negative direction. In this manner, the operating points of the two cores may be made to coincide and the hysteresis curves for each core become substantially identical so that for a zero signal condition in the tertiary, the output voltage is less than plus or minus two volts.

The principal reasons for using a separate tertiary winding are that, first, it affords complete D.C. isolation between the signal input circuit and the bias circuit thus eliminating any effect of one upon the other, and secondly, it is possible to use a large number of turns in the tertiary winding thereby affording maximum sensitivity with a relatively small number of turns for the secondary windings. The tertiary is wound common to both cores rather than on each core separately in order to minimize the total space required by the cores and windings, to reduce stray winding capacitance, and also to reduce the time required for winding the cores. In order to further reduce the winding capacitance in the amplifier, the principal effect of which is to shunt the tertiary winding and thus decrease the output voltage, each winding may be sectionalized into two or more sections. This is particularly important with regard to the tertiary winding due to its large number of turns and is accomplished by winding one half the total number of turns on one half of the core in several layers and then winding the remaining number of turns in several layers on the remaining half of the core. In this manner the capacitance effect may be reduced to a negligible value. The finished amplifier has a cross sectional form as shown in FIG. 6 wherein primary windings 12′—12″, secondary windings 13′—13″ and tertiary winding 14 are shown in their proper relationship to each other and to cores 28 and 29.

Although the schematic drawing of FIG. 2 shows cores 27′ and 27″ as being oppositely wound, it may be desirable in practice to wind the cores in the same direction and to thereafter connect the cores in the appropriate manner so as to obtain the series aiding and series opposing relationships abovedescribed.

From the foregoing disclosure it will be seen that applicants have provided a unique five winding magnetic amplifier which is five times more sensitive than prior amplifiers, which has easily variable sensitivity depending upon the values of resistors 57 and 58, which is compact and of minimum weight, which substantially reduces the capacitance effect of the windings and which provides a desirably high input impedance.

It should be understood that the foregoing disclosure relates only to a preferred embodiment of the invention and that numerous modifications and alterations may be made therein without departing from the spirit and scope of the invention as set forth in the appended claims.

Having thus described the invention, what is claimed is:

1. A system for amplifying a variable control signal prior to the application thereof to one of two output circuits comprising, a variable control signal source, a magnetic amplifier camprising a first primary winding wound on a first saturable core, a secondary primary winding wound on a second saturable core, a first secondary winding wound on said first core, a second secondary winding wound on said second core, a tertiary winding wound on both said first and second cores, said first and second primary windings connected in series opposition to a source of pulsing D.C. voltage, said first and second secondary windings connected in series-aiding relationship to a first output circuit, said first and second secondary windings connected to a second output circuit, means connecting said tertiary winding to said variable control signal source through a blocking capacitor in such a manner that a decrease in the magnitude of the variable control signal will cause a positive voltage to occur across said first and second secondary windings and an increase in the magnitude of the variable control signal will cause a negative voltage to occur across said first and second secondary windings, said first output circuit including a first rectifier means polarized to conduct when a positive voltage occurs across said first and second secondary windings, said second output circuit including a second rectifier means polarized to conduct when a negative voltage occurs across said first and second secondary windings.

2. The system as in claim 1 further including a biasing circuit connected across said first and second secondary windings for balancing the operation of said magnetic amplifier.

3. A pulse type magnetic amplifier comprising a first transformer having a first saturable toroidal core, a first primary winding on said first toroidal core, a first secondary winding on said first toroidal core, a second transformer having a second saturable toroidal core, a second primary winding on said second toroidal core, a second secondary winding on said second toroidal core, said first and second cores being arranged face to face in closely spaced relationship, a tertiary winding wound around both said first core and said second core, a primary circuit including said first and second primary windings connected in series opposing relationship, a secondary circuit including said first and second secondary windings connected in series-aiding relationship, a control signal source, said control signal having a varying amplitude, means connecting said primary circuit to a pulsing D.C. voltage source, capacitor means connecting said tertiary winding to said control signal source, said tertiary winding connected to said control signal source in such a manner that a decreasing magnitude control signal will cause a positive voltage across said secondary circuit and an increasing magnitude control signal will cause a negative voltage across said secondary circuit, a first output circuit connected to said secondary circuit including a rectifier means polarized to conduct when a positive voltage is applied to said secondary circuit, a second output circuit connected to said secondary circuit including a rectifier means polarized to conduct when a negative voltage is applied to said secondary circuit.

References Cited in the file of this patent

UNITED STATES PATENTS

| | | |
|---|---|---|
| 1,287,982 | Hartley | Dec. 17, 1918 |
| 2,164,383 | Burton | July 4, 1939 |
| 2,503,039 | Glass | Apr. 4, 1950 |